March 6, 1962
J. KUTTLER
3,023,829
OBSTRUCTION OPERATED BRAKE SETTING MECHANISM FOR ROAD VEHICLE
Filed June 10, 1960
2 Sheets-Sheet 1
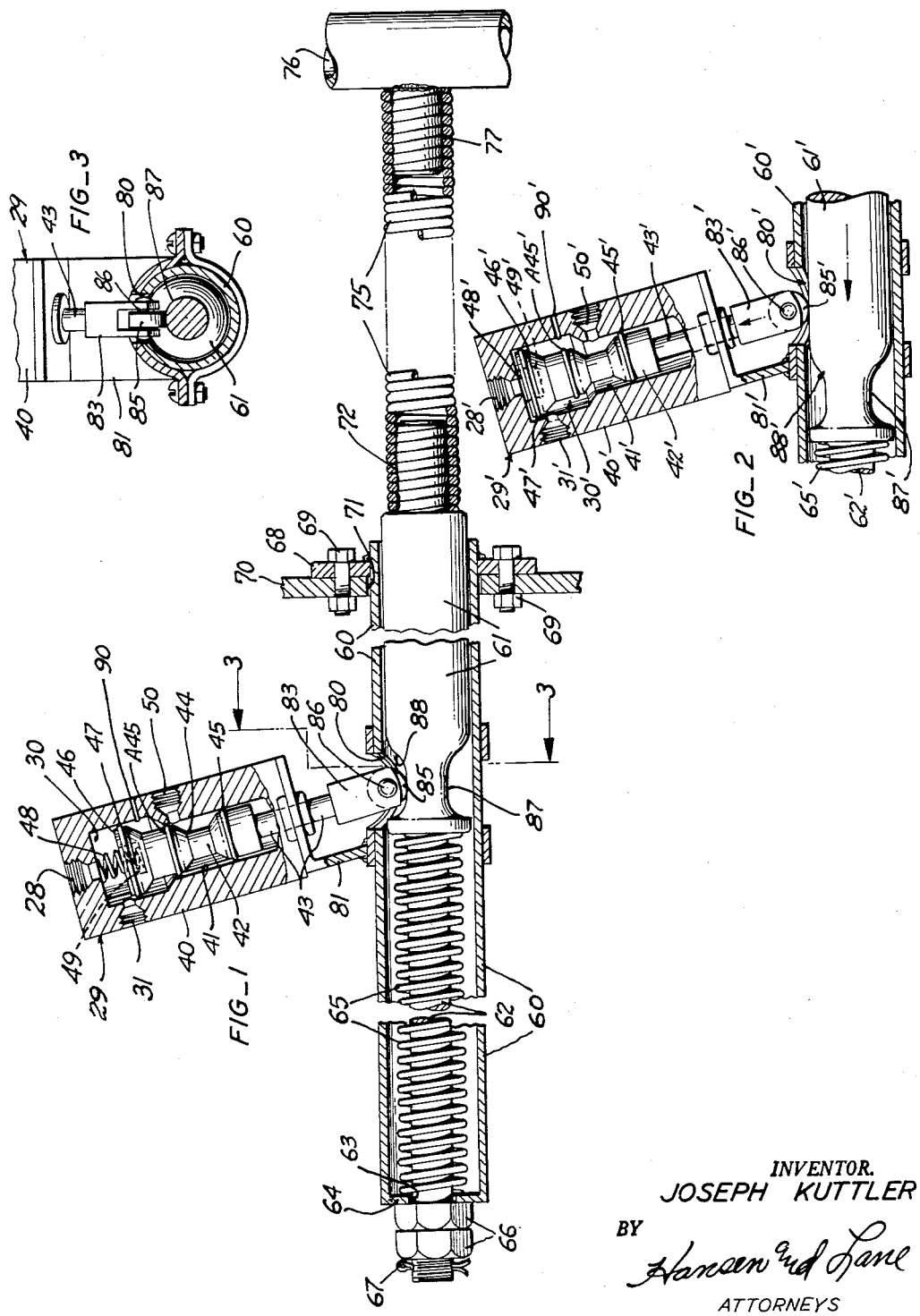
INVENTOR.
JOSEPH KUTTLER
BY
Hansen and Lane
ATTORNEYS

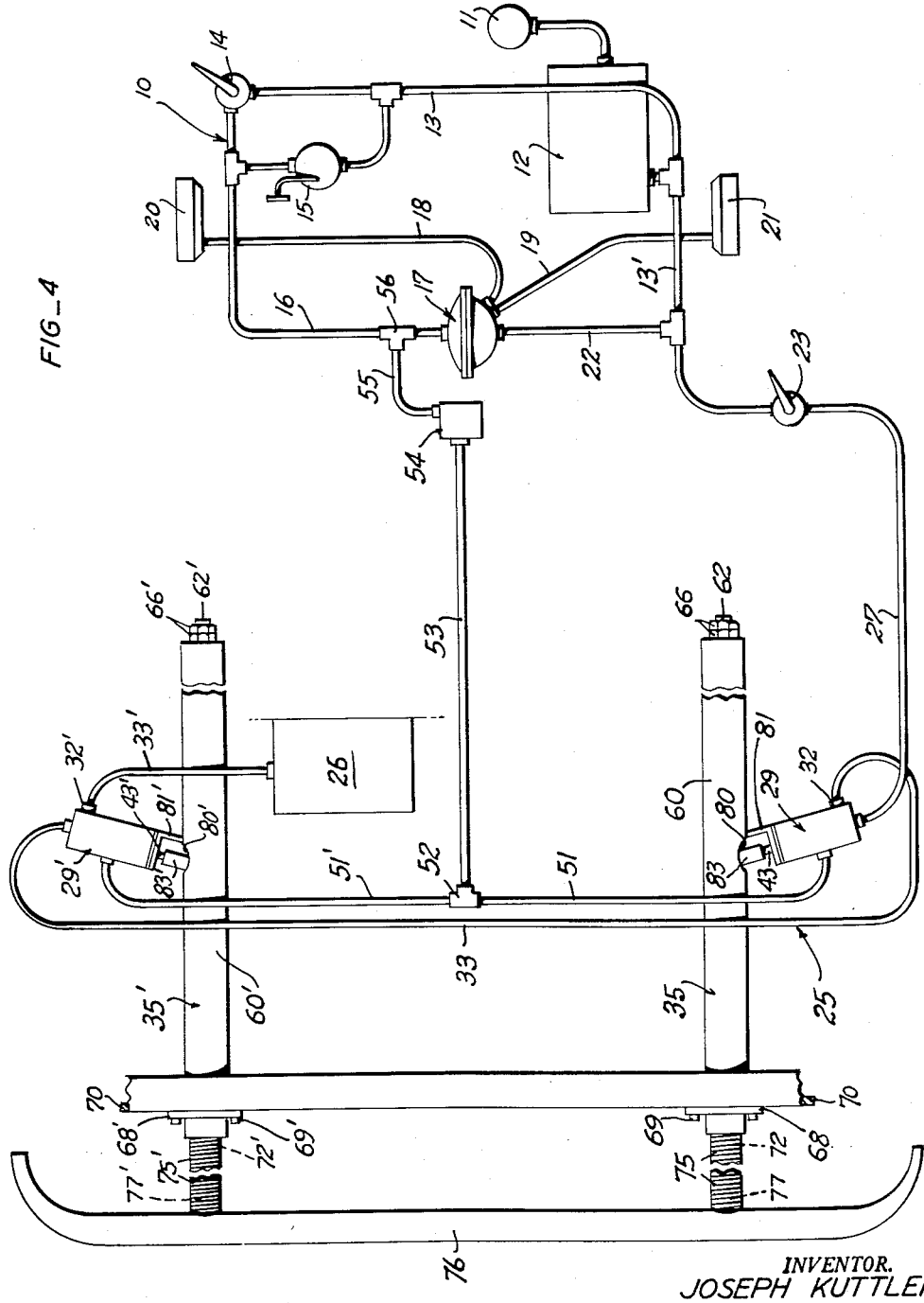
FIG_4

United States Patent Office 3,023,829
Patented Mar. 6, 1962

3,023,829
OBSTRUCTION OPERATED BRAKE SETTING
MECHANISM FOR ROAD VEHICLE
Joseph Kuttler, Lafayette, Calif., assignor to Brake and Bearing Service Co., Inc., San Jose, Calif., a corporation of California
Filed June 10, 1960, Ser. No. 35,368
8 Claims. (Cl. 180—83)

This invention relates to a device for automatically operating the brake mechanism of either an air or hydraulic brake system.

This invention is particularly directed to a back up brake operating mechanism as applied to the pressure line of a fluid brake system for the purpose of setting the brakes of a vehicle automatically upon engagement of the operating mechanism with an obstruction.

There have been various devices contrived for the purpose of automatically setting the brake mechanism of a vehicle as the latter engages an obstruction. This invention is directed to a mechanically operated mechanism operatively associated with a three-way valve system embodied in an auxiliary pressure line so as to automatically redirect pressurized fluid to the brake operating relay valve of the vehicle.

It is one object of this invention to provide a simple yet effective feeler and cam actuated mechanism associated therewith for the purpose of operating control valve or valves in a back up brake system.

It is another object of this invention to provide a bumper mechanism for dual control of separate valve mechanisms or both of them in series so that either one or the other of the valve mechanisms will automatically direct reserve fluid under pressure to the brake operating relay valve of a vehicle.

The bumper and valve operating mechanism of the present invention is suitably applied to truck and trailer brake systems in which a secondary air brake system is embodied in the trailer for tandem operation with the brake system in the leading vehicle or truck whereby to apply the brakes thereof automatically when the bumper meets with an obstruction.

These and other objects and advantages of the present invention will become apparent from a reading of the following description in the light of the drawings, in which:

FIG. 1 is a longitudinal section through the back up braking mechanism embodying the present invention.

FIG. 2 is a fragmentary portion of FIG. 1 with parts thereof in a different position.

FIG. 3 is a cross section through FIG. 1 as seen along line 3—3 thereof.

FIG. 4 is a schematic diagram of an air brake system embodying by-pass valves operatively associated with the back up brake operating mechanism of the present invention.

At the outset, reference being had to FIG. 4, an air or hydraulic brake system is indicated at 10. This is a conventional air brake or hydraulic brake system. In general, such brake systems include a compressor 11 for charging fluid under pressure into a reservoir 12. The reservoir communicates via a main line 13 with manually controlled valves in the cab of the vehicle. These valves may be either hand operated as shown at 14 or foot operated as at 15 or both, either one of which will permit the flow of fluid under pressure into a controlled pressure line 16 communicating with one side of a diaphragm or relay valve 17. The relay valve 17 has a pair of conduits 18 and 19 controlled thereby for admitting fluid under pressure into the air brake cylinders in the brake drums 20 and 21 of the vehicle on which the system is mounted. It will be noted that the opposite side of the relay or diaphragm valve 17 also communicates by way of a conduit 22 with an auxiliary supply line 13' emanating from the reservoir 12. This auxiliary supply line 13' is normally closed beyond its point of communication with the relay valve 17 by means of a hand controlled valve 23 in the present arrangement. The foregoing constitutes a simple fluid brake system by which to operate the braking mechanisms in the brake drums 20 and 21 of the wheels of the vehicle.

To this conventional brake system there has been added a back up brake system generally indicated 25 in FIG. 4. This back up brake system 25 includes a tank or reservoir 26 suitably secured to the chassis of the trailer vehicle or body. The reserve tank 26 is in direct communication with the auxiliary line 13' during normal operation of the vehicle provided the hand controlled valve 23 is opened. To this end the control valve 23 communicates with a supply line 27 having its opposite end secured to an inlet port 28 on a three-way valve 29 illustrated in detail in FIG. 1. Within this three-way valve 29 is a by-pass chamber 30 having communication with an outlet port 31 to which is secured a fitting 32 at one end of a conduit 33. This conduit 33 may, if desired, be connected directly to the auxiliary reserve tank 26 hereinbefore mentioned if but one back up brake control device 35 is to be employed. However, in the illustration of FIG. 4 two such back up brake control devices 35 and 35' are shown. Consequently an additional three-way valve 29' is shown associated with the additional back up control mechanism 35' in the present disclosure.

For purposes of the present illustration it should be understood that both three-way valves 29 and 29' as well as the back up control mechanisms 35 and 35' are identical and consequently like reference numerals are applied to like parts of each and distinguished from each other by the prime exponents as indicated in the drawing. In the case illustrated in FIG. 4 the conduit 33 terminates and is connected to the inlet port 28' of the three-way valve 29'. The by-pass chamber 30' of valve 29' has its outlet port 31' connected to a fitting 32' of a conduit 33' having its opposite end communicating with the reserve tank 26.

Referring to FIGS. 1 and 2 we have two views of the form of three-way valve employed. These units being identical it will be assumed for purposes of this description that the unit shown in FIG. 1 includes the three-way valve 29 whereas the unit shown in FIG. 2 is the other three-way valve 29' with parts thereof in brake actuating position.

As best illustrated in FIGS. 1 and 2 each three-way valve 29 or 29' comprises a main body 40 or 40' as the case may be, in which the by-pass chamber 30 or 30' respectively is formed on its internal end. This chamber 30 or 30' is tapered down to a reduced cylinder 41—41' within which a piston 42—42' is arranged for sliding movement. This piston is connected to a push rod 43—43' which extends through the opposite end of the body 40 or 40' for actuation in an axial direction coincident to the axis of the cylinder 41 or 41' in which it is mounted.

The piston 42—42' of each unit 29 and 29' respectively, has a reduced central chamber portion 44—44' confined between a pair of neoprene gaskets or piston rings 45—45' which are spaced from each other and have sealing engagement with the side walls of the cylindrical portion 41—41' of the valve body. The free end 46—46' of the piston 42—42' confined within the by-pass chamber 30—30' is enlarged and provided with a neoprene gasket or piston ring 47—47' which has sealing sliding engagement with the cylindrical wall of the chamber 30—30'. This piston ring 47—47' normally bears against the wall of the chamber 30—30' below the outlet port 31—31' as shown in FIG. 1 when the three-way valve is in non-braking condition. The piston 42—42' is held in non-braking condition by a compression spring 48—48' seated in a recess 49—49' formed on the enlarged head end 46—46' of the piston 42—42' and bearing against the end wall of the body 40—40'. When the piston is in this position as shown in FIG. 1 fluid under pressure entering the inlet port 28 is by passed out of the chamber 30 via the outlet port 31.

The reduced portion 44—44' of each piston 42—42' is normally disposed in communication with an outlet port 50—50', this port 50—50' being isolated from the by-pass chamber 30—30' by one piston ring A bearing against the cylindrical wall 41—41' closest to the by-pass chamber 30—30'.

In accordance with the present invention the outlet port 50—50' of each three-way valve means 29—29' respectively, is connected to a pressure line 51—51' respectively, joined to a T fitting 52. The T fitting 52 has common connection to a single conduit 53 terminating at a coupling unit 54. This coupling unit 54 in turn is connected via a pressure tube 55 to a T fitting 56 interposed in the control pressure lines 16 of the air brake system 10, previously explained.

From the foregoing it will be appreciated that when the hand valve 23 is open fluid under pressure discharging from the main reservoir 12 passes via conduits 13' and 27 into the by-pass chamber 30 of one three-way valve 29 and thence via conduit 33 to the by-pass chamber 30' of the other three-way valve 29' and out of the latter via conduit 33' into reserve tank 26 which thereafter remains fully charged and ready for service.

It will be noted therefore that while both three-way valves 29 and 29' are in non-braking position as shown in FIG. 1, the back up brake system 25 is isolated from the general brake system 10 excepting that the brake system 25 is ever ready to automatically operate the brakes of the vehicle in the event of movement of either or both pistons 42 and/or 42' into the position shown in FIG. 2 by operation of the unit 35 and/or 35'.

When either one of the pistons 42 and 42' is forced axially inward of the body supporting it, for example, assuming the upper unit 29' of FIG. 4 has its plunger 43' and piston 42' in the position shown in FIG. 2, it will be noted that the sealing ring 47' within the by-pass chamber 30' is shifted to a position between the inlet port 28' and the outlet port 31' to thereby discommunicate these two ports from each other. This immediately excommunicates the fluid in the reserve tank 26 from its source of supply. Simultaneously therewith, the inlet port 31' becomes an inlet communicated with the outlet port 50' by reason of the piston ring A45' being moved out of its normal position and into the by-pass chamber 30'. When this occurs the pressurized fluid within the pressure tank 26 immediately escapes via the conduit 33' into the chamber 30' via port 31' and out of the port 50' via the tube 51' and conduits 53—55 into the relay valve 17 just as though the hand brake 14 or foot brake 15 had admitted fluid into the valve 17 under pressure. It should here be noted that although fluid from the tube 51' may flow via tube 51 into the cylinder 41 of the other three-way valve 29, this flow is dead ended by reason of the chamber portion 44 thereof being wholly confined within the cylinder 41 and isolated from its by-pass chamber 30 as illustrated in FIG. 1. The flow of reserve fluid via the conduits 53—55 therefore automatically operates the relay valve 17 just as though the manually controlled valves had been operated for transmitting fluid under pressure direct from the main reservoir via the conduits 18 and 19 to the brake operating cylinders in the brake drums 20—21 for automatically setting the brakes on the vehicle.

It should here be noted that irrespective of whether one or the other of the three-way valves 29—29' is shifted into brake actuating position as shown in FIG. 2, fluid under pressure will run from the reserve tank 26 into the common tube 53 for transmission to the relay device 17 to automatically operate the brakes. In other words, assuming the three-way valve 29' were in normal position as shown in FIG. 1 whereas the three-way valve 29 were in the position shown in FIG. 2. Under these conditions fluid under pressure escaping from the reserve tank 26 via tube 33' would re-enter the by-pass chamber 30' and escape therefrom via the inlet port 28' into the conduit 33 and thence the chamber 30. However, on entering the by-pass chamber 30 of the valve mechanism 29, the fluid would be diverted out of the port 50 and into the tube 51 for transmission via common tube 53 to the relay valve 17. On the other hand should both units be actuated into the position shown in FIG. 2 it will be apparent that the fluid under pressure escaping from the reserve tank 26 would immediately charge into the by-pass chamber 30' of unit 29' and surge therefrom via its outlet port 50' into the tube or conduit. Now, even though such fluid under pressure may flow via tube 51 into the cylinder 41 of unit 29, such flow would be dead ended since the sealing ring 47 on the head end 46 of its piston excommunicates the flow of fluid out of the now closed system, the fluid passing out of port 50 into cross conduit 33 being blocked at the inlet port 28' which is isolated from the by-pass chamber 30' by the sealing ring 47' of the unit 29'. Consequently, fluid under pressure in the tubes 51—51' passes via the common conduit 53 into the relay valve 17 so as to automatically operate the latter for setting the brakes on the vehicle in the usual manner.

Having thus described the back up brake system and three-way control valve or valves thereof attention is now directed to the means 35—35' for actuating the three-way valves 29—29', respectively, reference being made to FIGS. 1, 2 and 3 of the drawing. Referring to FIG. 1, the device 35 comprises a sleeve housing 60 within which a plunger 61 is arranged for sliding fit and movement. This plunger 61 has a reduced shank end 62 which passes through an aperture 63 formed in the closed end 64 of the sleeve 60 for guided sliding movement. A compression spring 65 is mounted on the reduced portion 62 of the plunger 61 within the sleeve housing 60. This spring 65 is disposed between the enlarged portion of the plunger 61 and the end wall 64 of the sleeve housing 60. A pair of nuts 66—66' are threaded to the threaded end of the reduced shank 62 and these nuts are secured in place as lock nuts and keyed to the threaded portion by a cotter key 67 outside the closed end 64 of housing 60.

The opposite open end of the sleeve housing 60 has a flange member 68 secured thereto adapted to be secured by bolts 69 to a plate or flange 70 formed as a part of the chassis or frame of the vehicle to which the back up brake is attached. This plate 70 has an opening 71 formed therein through which the sleeve housing 60 extends, the flange 68 abutting the plate 70 and surrounding the opening 71 for securing the sleeve housing 60 thereto by means of bolts 69.

The plunger 61 extends out of the open end of the sleeve housing 60 and has a stud end 72 provided with spiral grooves 73 for threadedly receiving the close convolutes of a spring 75. For all intents and purposes this spring 75 acts as a yieldable feeler which extends rearwardly from the body of the vehicle on which the back up brake is secured. This spring feeler extends far enough back to be first to touch an obstruction during backing up of the vehicle. Upon engaging an obstruction during backing up of the vehicle the feeler spring 75 acts as a presser member against the plunger 61 for pushing the latter backwardly into the sleeve housing 60 against the action of the spring 65 therein.

It will be apparent that each of these feeler springs 75 or 75' may be provided with a pad or obstruction engaging member at their outer ends. In the present disclosure instead of individual pads I have shown single or common pads in the form of a rear bumper 76 (see FIG. 4). This bumper 76 has a pair of studs 77—77' aligned axially with each of the units 35—35' for threaded connection with the open ends of the close convoluted spring member 75—75' one such connection being illustrated in FIG. 1.

From the foregoing it will be seen that in backing up the vehicle, should the bumper bar 76 engage an obstruction at either one or the other of its ends, the plunger 61 or 61' at that end will be pushed back into its sleeve housing 60 or 60' as the case may be. In case the bumper 76 has straight engagement with an obstruction both plunger members 61 and 61' will be shifted rearwardly relative to their sleeve housings 60—60'.

On each of the units 35 and 35' the sleeve housing 60 and 60' is provided with an aperture 80 and 80', respectively, somewhere between the ends of the sleeve housing as illustrated in FIG. 4. A bracket member 81—81' is secured to the sleeve housing 60—60', respectively, for supporting the three-way valve mechanism 29 or 29' as the case may be, adjacent the aperture 80 or 80' in the side wall of the sleeve housing with which it is associated. The outer end of the piston rod 43—43' extending from the three-way valve 29—29', respectively, carries a trunnion type yoke 83—83' between the legs of which a roller member 85—85' is journaled on a cross shaft 86—86'.

This roller 85—85' is disposed at the aperture 80—80' for engagement with the plunger 61—61', as the case may be. The inner end of the enlarged portion of the plunger 61—61' is provided with a reduced area 87—87' to provide a cam acclivity 88—88' on the plunger 61—61'. This cam acclivity 88—88' is on that side of the roller member which is closest to the rear bumper of the vehicle so that when the plunger 61—61' is urged inwardly of the sleeve housing 60—60' the cam acclivity 88—88' will bear against the roller member 85—85' to force the latter and the piston rod 43—43' associated therewith outwardly relative to the sleeve housing. In this connection it will be noted that the longitudinal axis of the three-way valve mechanism is set at an angle to lean in a direction away from the acclivity 88—88' on the plunger 61—61' so that a pushing action as well as an outward thrust is exerted substantially axially of the piston rod 43—43' when the acclivity 88—88' forces the roller 85—85' out of the sleeve housing. In this manner when the plunger 61—61' is forced back into its sleeve housing the plunger 43 or 43' is pushed into the position as shown in FIG. 2 and the roller 85 or 85' rides upon the periphery of the enlarged portion of the plunger 61 or 61' thus holding the three-way valve mechanism with which the rollers are associated in automatic braking condition so long as the bumper 76 is bearing against an obstruction against which the truck is being backed.

The whole purpose of the back up brake system 25 is to warn the driver of the vehicle that the truck i.e., the feeler or bumper 77 has met with an obstruction the effect of which is somewhat like that resulting from a sudden application of the hand or foot brake 14 or 15 in the cab of the vehicle. Obviously, the fluid under pressure from the reserve tank 26 to the common tube 53 and relay 17 being isolated, the back up brake system 25 would set the brakes and render the vehicle immobile. Since the back up brake system is intended as a mere warning each three-way valve 29 and 29' is provided with a pressure relief aperture 90 and 90' respectively, for the purpose of bleeding or relieving, within a time limit, the fluid pressure in the otherwise locked or isolated portion of the auxiliary brake system 25.

Referring again to FIGS. 1 and 2 it will be noted that the aperture 90—90' is bored through the body 40—40' at that zone of the by-pass chamber 30—30' which is between the port 31—31' and the port 50—50'. In other words, with the units 29 or 29' disposed in non-braking position as shown in FIG. 1 the pressure relief aperture 90—90' is in an isolated zone of the by-pass chamber 30—30' which is confined between the sealing ring 47—47' and the piston ring A45—A45'. Consequently, no loss of pressure occurs via the bleeder apertures 90—90' when the three-way valves are in non-braking position. However, when the piston 42—42' of the three-way valve is in automatic braking position as shown in FIG. 2, the bleeder aperture 90—90' is in communication with the cross feed zone between the port 31—31' and the port 50—50' so as to immediately relieve the pressure in that isolated portion of the brake system 25 which is in communication with the relay valve 17 via the common tube 53.

It should here be noted that the bleeder apertures 90 and 90' are of a restrictive size calculated to withstand complete relief of pressure in the brake setting portion of the system for a predetermined time lapse. Such time lapse need be no longer than 30 seconds since that is sufficient to warn the driver of the vehicle that the bumper 76 has met with an obstruction. Thereafter the driver immediately sets his hand brake 14 or foot brake 15 since the automatically operated system will now be rendered void. Consequently, the driver may if necessary drive the vehicle forward or jockey the truck and trailer into a more convenient unloading position relative to a loading dock. In the meantime should the plungers 61 and 61' on the bumper operated mechanisms 35 and 35' return by their springs 65 and 65' to normal position, the three-way valves 29 and 29' will automatically return by their springs 48 and 48' to non-braking position as shown in FIG. 1 whereupon the reserve tank 26 will again be recharged with fluid under pressure and the back up brake system 25 again conditioned to automatically operate the relay valve 17 to set the brakes on the vehicle.

While I have described my new back up brake operated mechanism in specific detail it will be appreciated by those skilled in the art that the same is susceptible to modification, alteration and/or variation without departing from the spirit of my invention. I therefore desire to avail myself of all modifications, alterations and/or variations as fairly come within the purview of the appended claims.

What I claim as new and desire to protect by Letters Patent is:

1. In a fluid brake system including a source of fluid under pressure controlled by manually operated valves to direct fluid under pressure to a relay valve for setting the brakes of a vehicle; a back-up brake system communicating directly with said source of supply and said relay valve for by-passing said manually operated valves, comprising a reserve tank, a three-way valve having a cylinder formed therein, a by-pass chamber in said cylinder, said valve having an inlet port for said by-pass chamber communicating with said source of supply and an outlet port for said by-pass chamber communicating with said reserve tank to normally charge the same with fluid under pressure directly from said source of supply, spring loaded piston means in said cylinder having one end disposed in said by-pass chamber provided with a piston ring normally disposed therein for communicating said inlet and outlet ports with each other, said piston having a pair of piston rings spaced from each other and normally disposed within said cylinder, a port formed in said valve body between said pair of piston rings on said piston and communicating with said relay valve, a piston rod on said piston extending from said valve body, and valve actuating means secured to said vehicle including a back-up feeler adapted to meet an obstruction during backing up of the vehicle for shifting said piston within said valve body for excommunicating said inlet port from said outlet port and for communicating said outlet port with said port communicating with said relay valve for directing fluid under pressure to the latter from said reserve tank to automatically set the brakes of said vehicle.

2. In a fluid brake system including a source of fluid under pressure controlled by manually operated valves to direct fluid under pressure to a relay valve for setting the brakes of a vehicle; a back-up brake system communicating directly with said source of supply and said relay valve for by-passing said manually operated valves including a reserve tank, a three-way valve comprising a valve body having a cylinder and a by-pass chamber formed therein communicating with each other, an inlet port for said by-pass chamber communicating with said source of supply, an outlet port for said by-pass chamber communicating with said reserve tank, piston means in said cylinder having one end disposed in said by-pass chamber provided with a sealing ring normally disposed therein, spring means in said cylinder normally urging said piston into a position wherein said sealing ring is disposed for communicating said inlet and outlet ports with each other, said piston having a pair of piston rings normally disposed within said cylinder, a third port formed in said valve body between said pair of piston rings when in normal disposition and communicating with said relay valve, a piston rod on said piston extending from said valve body, and valve actuating means secured to said vehicle including a back up feeler adapted to meet an obstruction during backing up of the vehicle for shifting said piston within said valve body against the action of said spring means for excommunicating said inlet port from said outlet port and for communicating said outlet port with said third port communicating with said relay valve for directing fluid under pressure to the latter from said reserve tank to automatically set the brakes of said vehicle.

3. In a fluid brake system including a source of fluid under pressure controlled by manually operated valves to direct fluid under pressure to a relay valve for setting the brakes of a vehicle and an auxiliary brake system communicating directly with said source of supply and said relay valve for by-passing said manually operated valves; back-up brake operating mechanism for said auxiliary brake system comprising a reserve tank, a three-way valve having a cylinder and a by-pass chamber formed therein, an inlet port for said by-pass chamber communicating with said source of supply, an outlet port for said by-pass chamber communicating the latter with said reserve tank, piston means in said cylinder and by-pass chamber having a sealing ring disposed in said by-pass chamber and a pair of piston rings disposed within said cylinder, spring means in said cylinder bearing against said piston to normally dispose said sealing ring for communicating said inlet and outlet ports with each other and to dispose said pair of piston rings within said cylinder, a third port for said three-way valve between said pair of piston rings on said piston when said piston rings are disposed within said cylinder, said third port communicating with said relay valve, a piston rod on said piston extending from said valve, and a back-up feeler secured to said vehicle so as to be first to meet an obstruction during backing up of the vehicle comprising a sleeve housing secured to said vehicle, a spring urged plunger in said sleeve housing, roller means on the end of said piston rod bearing against said plunger, and cam means on said plunger engageable with said roller on movement of said plunger upon meeting with an obstruction for shifting said piston within said three-way valve for excommunicating said inlet port from said outlet port and for communicating said outlet port with said third port communicating with said relay valve for directing fluid under pressure to the latter from said reserve tank to automatically set the brakes of said vehicle.

4. In a fluid brake system including a source of fluid under pressure controlled by manually operated valves to direct fluid under pressure to a relay valve for setting the brakes of a vehicle and a back-up brake system including a reserve tank communicating directly with said source of supply and said relay valve for by-passing said manually operated valves, a three-way valve in said back-up brake system comprising a valve body having a cylinder and a by-pass chamber formed therein, said valve body having an inlet port to said by-pass chamber communicating with said source of supply and an outlet port to said by-pass chamber communicating the latter with said reserve tank to charge the same with fluid under pressure, a third port formed in said valve body for communicating said cylinder with said relay valve, piston means in said cylinder having a pair of psiton rings normally straddling said third port, and having one end disposed to said by-pass chamber provided with a piston ring normally disposed therein for communicating said inlet and outlet ports with each other, a piston rod on said piston extending from said body, spring means in said cylinder for urging said piston into the normal position aforesaid, and means for actuating said three-way valve comprising a sleeve housing secured to said vehicle, a spring urged plunger arranged for sliding movement in said sleeve housing, cam means on said plunger exposed to said piston rod, and a bumper pad on said plunger adapted to be the first to engage an obstruction during backing up of said vehicle to shift said plunger and cam means thereon into a position to urge said piston rod inwardly of said cylinder for excommunicating said inlet port from said outlet port and communicating the latter with said third port for directing fluid from said reserve tank into said relay valve.

5. In a vehicle back-up brake system having a source of fluid supply communicating with a reserve tank via a three-way valve adapted on operation to direct fluid under pressure from said reserve tank to a brake operating relay valve for automatically setting the brakes of the vehicle; a back-up brake operating mechanism comprising a sleeve housing secured in a fore to aft direction at the rear of said vehicle, a plunger arranged for sliding movement in said housing and projecting therefrom rearwardly of said vehicle, yieldable means within said housing for maintaining said plunger in a rearwardly projecting position relative thereto, said three-way valve having a piston rod extending therefrom, roller means on the end of said piston rod, said sleeve having an opening formed therein for exposing said plunger, a cam acclivity on said plunger exposed through said opening, and means securing said three-way valve to said sleeve housing with the roller on the end of said piston rod bearing against said plunger ahead of said cam acclivity whereby to press said piston rod into said three-way valve to operate the same when the rearwardly extending end of said plunger meets an obstruction during backing up of said vehicle.

6. In a vehicle back-up brake system having a source of fluid supply communicating with a reserve tank via a piston operated valve adapted on operation to direct fluid under pressure from said reserve tank to a brake operating relay valve for automatically setting the brakes of the vehicle; a back-up brake operating mechanism comprising a sleeve housing secured in a fore to aft direction at the rear of said vehicle, a plunger arranged for sliding movement in said housing and projecting therefrom rearwardly of said vehicle, so as to be first to meet an obstruction during backward movement of said vehicle, yieldable means within said housing for maintaining said plunger in a rearwardly projecting position relative thereto, said valve having a piston rod extending therefrom, roller means on the end of said piston rod, said sleeve having an opening formed therein for exposing said plunger, a cam recess and acclivity on said plunger exposed through said opening, means for securing said valve to said sleeve housing with said roller means bearing against the recess on said plunger ahead of said cam acclivity thereof whereby to depress said piston rod and operate said valve when the rearwardly extending end of said plunger shifts within said sleeve housing upon meeting with an obstruction during backing up of said vehicle.

7. In a vehicle back-up brake system having a source of fluid supply communicating with a reserve tank via dual three-way valves either of which is adapted on operation to direct fluid under pressure from said reserve tank to a brake operating relay valve for automatically setting the brakes of the vehicle; a back-up brake operating mechanism comprising a pair of sleeve housings secured in a fore to aft direction and spaced in parallel relation at the rear of said vehicle, a plunger arranged for sliding movement in each of said housings and projecting therefrom rearwardly of said vehicle, a bumper bar secured to the projecting ends of said plungers so as to be the first to meet an obstruction during backing up of said vehicle, yieldable means within each of said housings for maintaining said plungers in a rearwardly projecting position relative thereto, each said three-way valve having a piston rod extending therefrom, roller means on the end of said piston rods, said sleeves each having an opening formed therein for exposing the plunger therein, a cam acclivity on each said plunger exposed through the opening in the sleeve housing related thereto, and means securing each said three-way valve to a respective one of said sleeve housings with the roller on the end of each said piston rod bearing against its respective plunger ahead of the cam acclivity thereon to thereby depress said piston rods and operate three-way valves when said bumper meets an obstruction during backing up of said vehicle and shifts said plungers within said sleeve housings against the action of said yieldable means.

8. In a vehicle back-up brake system having a source of fluid supply communicating with a reserve tank via valve having an actuating lever adapted on operation to direct fluid under pressure via said valve from said reserve tank to a brake operating relay valve for automatically setting the brakes of the vehicle; a back-up brake operating mechanism comprising a sleeve housing secured in a fore to aft direction at the rear of said vehicle, a plunger arranged for sliding movement within said housing and projecting therefrom rearwardly of said vehicle, said plunger having a reduced end guided for sliding movement through the fore end of said sleeve housing, spring means on the reduced end of said plunger within said housing for urging said plunger rearwardly relative thereto, said sleeve having an opening formed therein for exposing said plunger, a cam acclivity on said plunger exposed through said opening, and means securing said three-way valve to said sleeve housing adjacent said opening to dispose the valve actuating lever of said valve in bearing engagement with said plunger ahead of said cam acclivity whereby to operate said valve when said plunger is shifted forwardly within said sleeve housing by an obstruction during backing up of said vehicle.

References Cited in the file of this patent
UNITED STATES PATENTS

| | | |
|---|---|---|
| 2,588,815 | Fasolino | Mar. 11, 1952 |
| 2,720,275 | Thayer | Oct. 11, 1955 |